(12) United States Patent
Nelson

(10) Patent No.: US 7,983,413 B2
(45) Date of Patent: Jul. 19, 2011

(54) VOIP ACCESSORY

(75) Inventor: Joakim Nelson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1324 days.

(21) Appl. No.: 11/298,734

(22) Filed: Dec. 9, 2005

(65) Prior Publication Data

US 2007/0133514 A1    Jun. 14, 2007

(51) Int. Cl.
*H04M 9/00*    (2006.01)
(52) U.S. Cl. ............ 379/434; 379/88.13; 455/90.2; 370/338; 370/352; 709/223; 381/74
(58) Field of Classification Search ........... 455/414.1, 455/550.1, 557, 436, 90.2, 435.3; 370/260, 370/352, 338; 713/300; 709/223; 381/74; 379/88.13, 434
See application file for complete search history.

(56) References Cited

U.S. PATENT DOCUMENTS

| 7,188,264 B2* | 3/2007 | Morisawa | 713/300 |
| 7,215,959 B2* | 5/2007 | Creamer et al. | 455/436 |
| 7,392,050 B2* | 6/2008 | Svensson et al. | 455/435.3 |
| 2003/0206546 A1* | 11/2003 | Beyda | 370/352 |
| 2004/0204084 A1* | 10/2004 | Tan et al. | 455/557 |
| 2004/0228476 A1 | 11/2004 | Denninghoff | |
| 2005/0195778 A1* | 9/2005 | Bergs et al. | 370/338 |
| 2007/0165875 A1* | 7/2007 | Rezvani et al. | 381/74 |

FOREIGN PATENT DOCUMENTS

| EP | 1 347 623 | 9/2003 |
| JP | 2004 135324 | 4/2004 |
| JP | 2005-110129 | 4/2005 |
| JP | 2005-323265 | 11/2005 |
| WO | 2004/095818 | 11/2004 |

OTHER PUBLICATIONS

Written Opinion for International Application No. PCT/IB2006/001499 dated Sep. 28, 2006.
Written Opinion for International Application No. PCT/IB2006/001499 dated Nov. 23, 2007.
International Preliminary Report on Patentability for International Application No. PCT/IB2006/001499 dated Feb. 20, 2008.

* cited by examiner

*Primary Examiner* — Md S Elahee
(74) *Attorney, Agent, or Firm* — Renner, Otto, Boisselle & Sklar, LLP

(57) ABSTRACT

An accessory for electronic equipment includes an interface for exchanging data between the accessory and the electronic equipment, and a voice over internet protocol (VOIP) circuit. The VoIP circuit is operatively configured to implement at least a portion of VoIP in the electronic equipment or the accessory.

22 Claims, 3 Drawing Sheets

VOIP ACCESSORY

TECHNICAL FIELD OF THE INVENTION

The present invention relates generally to the field of voice communications and, more particularly, to voice over internet protocol (VoIP).

DESCRIPTION OF RELATED ART

The traditional telephone network is a switched network that provides users with a dedicated end-to-end circuit for the duration of each call. Circuits are reserved between the originating switch, tandem switches (if any), and the terminating switch based on the called party number to create the end-to-end circuit.

Recently, telephone calls have been transmitted over digital networks via packet switched networks using Internet protocol (IP networks), termed voice over IP (VoIP) transmission. Packet-switched IP networks provide shared, virtual circuit connections between users. Voice information to be transmitted across an IP network is converted into digital data and broken up into multiple, discrete packets. Individual packets may travel over different network paths to reach the final destination where the packets are reassembled in the proper sequence to reconstruct the original voice information.

For example, in an internet telephony session between a first and second party, an internet connection is provided between communication equipment at the first party's premises and communication equipment at the second party's premises via their respective internet service providers. During the telephony session each party's communication equipment generates a stream of samples of the party's speech or other sound(s) which is parsed into a sequence of groups referred to as "audio frames". Each audio frame contains a predetermined desired number of samples and corresponds to a desired sampling period. The communication equipment encodes the samples in each audio frame in a constellation of symbols using an appropriate audio encoding scheme such as PCM, ADPCM or LPC.

Each encoded audio frame is encapsulated in a "real time transport packet" in accordance with a real time transport protocol. Under the ITU-T H323 internet telephony standard, the audio frame is encapsulated in an RTP packet in accordance with a real time protocol referred to by the acronym "RTP". RTP is defined in Schulzrinne, et al., "RTP: A Transport Protocol for Real-Time Applications", RFC 1889, Internet Engineering Task Force, January 1996.

In accordance with RFC 1889, the real time transport packet, hereinafter referred to as an "RTP packet", that encapsulates the audio frame comprises a header having a sequence number. The sequence number corresponds to the temporal order of the audio frame in the RTP packet relative to other audio frames in the sequence of audio frames generated by the communication equipment. Each RTP packet is in turn packaged in a data packet with a suitable data packet header according to an internet transport protocol. Typically, the internet transport protocol for "RTP transmission" is UDP. The data packets are transmitted in a stream of data packets over the internet to the other party.

When the other party receives the stream of data packets, the other party's communication equipment strips each data packet in the stream and its enclosed RTP packet of their respective headers to "unload" the audio frame "payload" in the RTP packet. The communication equipment then concatenates the unloaded audio frames sequentially according to the sequence numbers of their respective RTP packets. The concatenated audio frames are decoded and converted to analog audio signals to reproduce the speech or other sound(s) of the party transmitting the data packets.

SUMMARY OF THE INVENTION

Voice over internet protocol (VoIP) transmission has proven to be a reliable and efficient manner in which voice communications may be exchanged over long distances at relatively low costs. Presently, voice communications via the internet have been implemented using PSTN (public switched telephone networks), mobile phones and/or personal computers. Implementation of VoIP on mobile phones, however, while technically feasible, may be unattractive in certain circumstances. More specifically, mobile or cellular service providers gain revenue by selling voice communications via their mobile or cellular circuit switched networks. Since VoIP can significantly reduce the amount of voice traffic handled by these networks (and thus revenues), cellular service providers may be reluctant to offer phones that include VoIP functionality.

The present invention provides a device and method that enables mobile radio terminals, such as mobile phones or the like, to be offered without VoIP functionality (thereby avoiding a potential conflict with cellular service providers), yet allowing such devices to be easily modified via an accessory, such as a head set, for example, so as to implement VoIP functionality in the mobile phone. A user who wishes to implement VoIP functionality on his or her mobile phone simply can use an accessory that includes a VoIP processing circuit in accordance with the invention. The VoIP processing circuit can be configured to automatically implement VoIP functionality in the mobile phone, in the accessory, or in a combination of the phone and the accessory.

According to one aspect of the invention, an accessory for electronic equipment includes an interface for exchanging data between the accessory and the electronic equipment, and a VoIP circuit, wherein the VoIP circuit is operatively configured to implement at least a portion of VoIP in the electronic equipment or the accessory.

In one embodiment, the accessory can be a communications head set, a battery pack, a memory, or another electronic equipment, and in another embodiment, the electronic equipment can be a mobile phone.

In one embodiment, the VoIP circuit can include a processor and code executable by the processor, and in another embodiment, the VoIP circuit can include memory and code stored in the memory. Further, the code can comprise firmware of the accessory. In another embodiment, the VoIP circuit can be implemented in hardware.

In one embodiment, the interface can be a Bluetooth interface or an electrical connection between the accessory and the electronic equipment.

In one embodiment, the VoIP circuit can create a client-server configuration. In another embodiment, the accessory can be a server and the electronic equipment can be the client, or the accessory can be the client and the electronic equipment can be the server.

In one embodiment, the electronic equipment can control at least one user interface, and the accessory and/or electronic equipment can control VoIP processing. In another embodiment, the user interface can be at least one of an electronic phone book, a phone number, a ring tone, a key pad entry or a data display. In another embodiment, the electronic equipment can be configured to operate as an input/output terminal.

In one embodiment, VoIP can be implemented in the electronic equipment, the accessory, or shared between the electronic equipment and the accessory.

According to another aspect of the invention, an accessory for electronic equipment includes a memory and a computer program stored in the memory, wherein the computer program comprises code that establishes a communication link between the accessory and the electronic equipment, and code that transfers at least part of a VoIP application to the electronic equipment via the communication link, whereby the electronic equipment may be used to establish VoIP communications.

According to yet another aspect of the invention, a method of implementing VoIP in electronic equipment includes the steps of: establishing a data link between the electronic equipment and an accessory of the electronic equipment; and using the accessory to implement at least a portion of VoIP functionality in the electronic equipment or the accessory.

In one embodiment, implementing at least a portion of VoIP functionality can include configuring the electronic equipment as an input/output terminal.

In one embodiment, establishing the data link can include using a wireless data link. In another embodiment, using the wireless data link can include using a Bluetooth data link.

In one embodiment, a client-server configuration can be established. In another embodiment, the accessory can be configured as the server and the electronic equipment can be configured as the client, or the accessory can be configured as the client and the electronic equipment can be configured as the server.

In one embodiment, using the accessory can include using at least one of a head set, a memory, a battery pack, or a second electronic device as the accessory.

In one embodiment, a VoIP gateway can be accessed via the electronic equipment and/or the accessory, wherein access to the VoIP gateway can be via a local area network, a wide area network, or a cellular circuit switched network.

In one embodiment, implementing at least a portion of VoIP functionality in the electronic equipment or the accessory can include implementing voice sampling and network control algorithms.

In one embodiment, a computer program product directly loadable into internal memory of a digital computer can include software code portions for performing the method of implementing VoIP in electronic equipment when said product is run on a computer.

According to another aspect of the invention, a computer program stored on a computer usable medium for implementing voice over internet protocol (VoIP) in electronic equipment via an accessory for the electronic equipment can include code that establishes a data link between the electronic equipment and the accessory, and code that implements at least a portion of VoIP in the electronic equipment or the accessory.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The term electronic equipment includes portable radio communication equipment. The term portable radio communication equipment, which hereinafter is referred to as a mobile radio terminal, includes equipment such as mobile telephones, communicators, i.e., electronic organizers, personal digital assistants (PDAs) smart phones or the like.

The present invention enables a user quickly and easily to implement voice over internet protocol (VoIP) functionality in a mobile radio terminal, such as a mobile phone or the like. More specifically, the invention enables VoIP functionality via an accessory of the mobile phone. In the embodiments described herein, the mobile radio terminal is a mobile phone and the accessory is a communications head set that includes a speaker and a microphone. An accessory as used herein, however, is not limited to a head set and may include any device that can be added to or used in conjunction with the mobile phone. This can include, for example, memory cards, battery packs, head sets, another phone (e.g., a Bluetooth enabled phone) or any other device that can be added to the mobile phone, communicate with the mobile phone, and/or is not part of the mobile phone as provided by the manufacturer and/or the service provider.

The accessory includes an interface circuit, such as a wireless (e.g., Bluetooth) or wired (e.g., cable) communications link, a memory interface, etc., that enables the accessory to exchange data with the mobile phone. The accessory also includes a VoIP processing circuit, wherein the VoIP processing circuit reconfigures the mobile phone and/or accessory so as to enable VoIP communications. Once configured, VoIP functionality may reside in the mobile phone, in the accessory, or shared between the phone and the accessory. For example, the accessory may act as a server and the phone as a client, wherein the accessory coordinates or otherwise handles the transfer of voice data packets over a packet switched network, while the mobile phone is used as an I/O device (e.g., keypad entry and data display). Alternatively, the roles may be reversed and the accessory may act as the client and the phone as the server.

Figure 1:
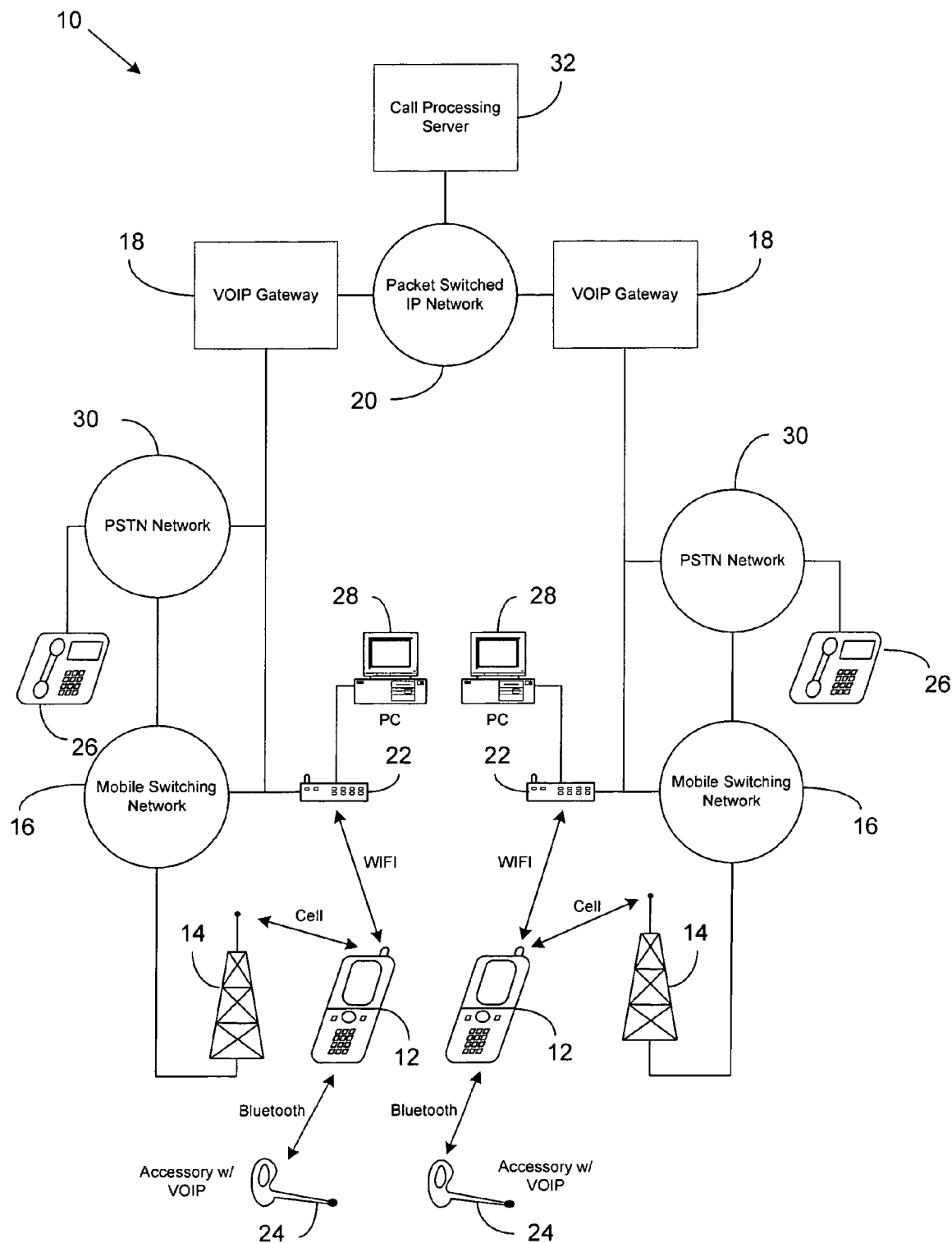
FIG. 1 is a block diagram illustrating an exemplary communications network in accordance with the invention.

Referring initially to FIG. 1, there is shown an exemplary communications network 10 in which phone conversations using a packet switched IP network are enabled. In FIG. 1, a user employs a first communications device, such as a mobile phone 12 or the like, to communicate through a first mobile phone tower 14 and first mobile switching network 16, a first VoIP gateway 18, a packet switched IP network 20, a second VoIP gateway 18, and a second mobile switching network 16 and tower 14 to a second communications device 12. Alternatively, the communications device 12 may access the VoIP gateway 18 via a local area network (LAN) or a wide area network (WAN), e.g., using a wireless router 22 or the like to access the VoIP gateway 18. Such a connection may be realized using the wireless communications protocol described in the 802.11a, b and/or g standards, for example, or in any other wireless communications protocol. Voice communications using VoIP may be made directly through the mobile phones 12 or via an accessory 24, such as a Bluetooth head set, for example.

As will be appreciated by those skilled in the art, other devices, e.g., a land-based telephone 26, a voice-equipped personal computer (PC) or laptop computer 28, a satellite phone (not shown), a hand-held computer (not shown) or any other device capable of transmitting sound, or sound in conjunction with video, may be used to communicate over the communications network 10, provided the appropriate infrastructure is in place (e.g., a public switched telephone network (PSTN) 30 for land-based phones 26). In the case where a voice-equipped PC or laptop computer 28 is used, the PC or laptop computer would require a microphone, at least one speaker and supporting software. Further, the user may either initiate the call or receive the call, and the call may be initiated by one type of device (e.g., a mobile phone 12) and received by another type of device (e.g., a land based phone 26 or PC 28). Also, the user is not limited to contacting another human being when placing the call, but may instead contact any form of sound reproduction device including a computer.

Still referring to FIG. 1, the VoIP gateway 18 is interfaced to the packet switched IP network 20. This packet switched IP network 20 may be the Internet, a LAN or a WAN. The packet switched IP network 20 uses a call processing server (CPS) 32 that provides call setup and tear down capability to other gateways. This CPS 32 also maintains an updated view of the call state and physical location of all gateway ports. CPS 32 can support thousands of simultaneous calls throughout a geographically distributed network. CPS 32 may be implemented in software running on a PC connected to the packet switched IP network 20 or any device where complex logic may be implemented such as firmware.

Figure 2A:
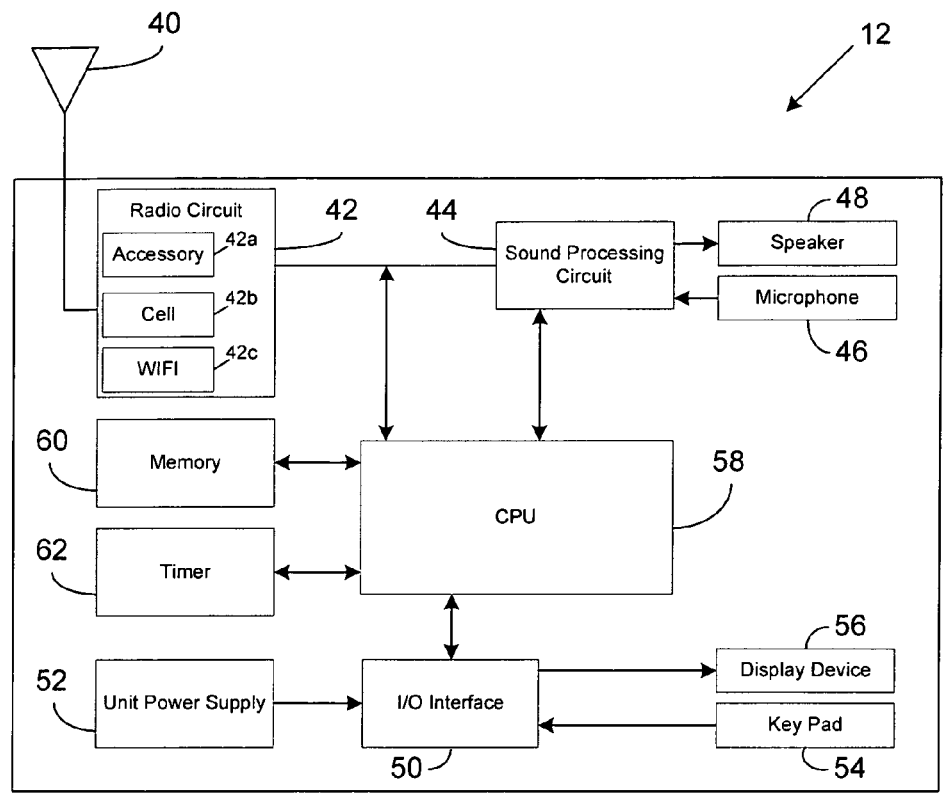
FIG. 2A is a block diagram of an exemplary cellular phone.

Moving now to FIG. 2A, a block diagram of an exemplary mobile phone 12 that can be used in conjunction with the invention is shown. The mobile phone 12 includes an antenna 40 operatively coupled to a radio circuit 42. The radio circuit 42 can include an accessory communications circuit 42a (e.g., Bluetooth or other wireless communications technique) for communicating with an accessory, a conventional mobile phone receiver/transmitter 42b for communicating via a conventional mobile phone network (e.g., via cellular towers or satellite), and a wireless network communications circuit 42c (also referred to as WIFI) for communicating with a LAN or WAN, for example. Although not shown, it will be appreciated that separate antennas may be provided for each of the respective radio circuits 42a, 42b and 42c. The mobile phone also includes a sound processing circuit 44, which, in conjunction with a microphone 46 and speaker 48, enable sound to be input and output from the mobile phone 12. Further, an I/O interface 50 distributes power from a power supply 52 (e.g., a battery) to the various sections of the mobile phone 12, and the I/O interface 50 receives data from a key pad 54 and provides data to a display 56. The radio circuit 42, sound processing circuit 44 and I/O interface 50 are operatively coupled to a processor 58 (e.g., a CPU), which, in conjunction with memory 60 and timer 62, executes code stored in memory 60 so as to implement the mobile phone functionality, e.g., wireless voice communications, recognition of keypad entries, display control, WAN interface, accessory communications, etc.

Figure 2B:
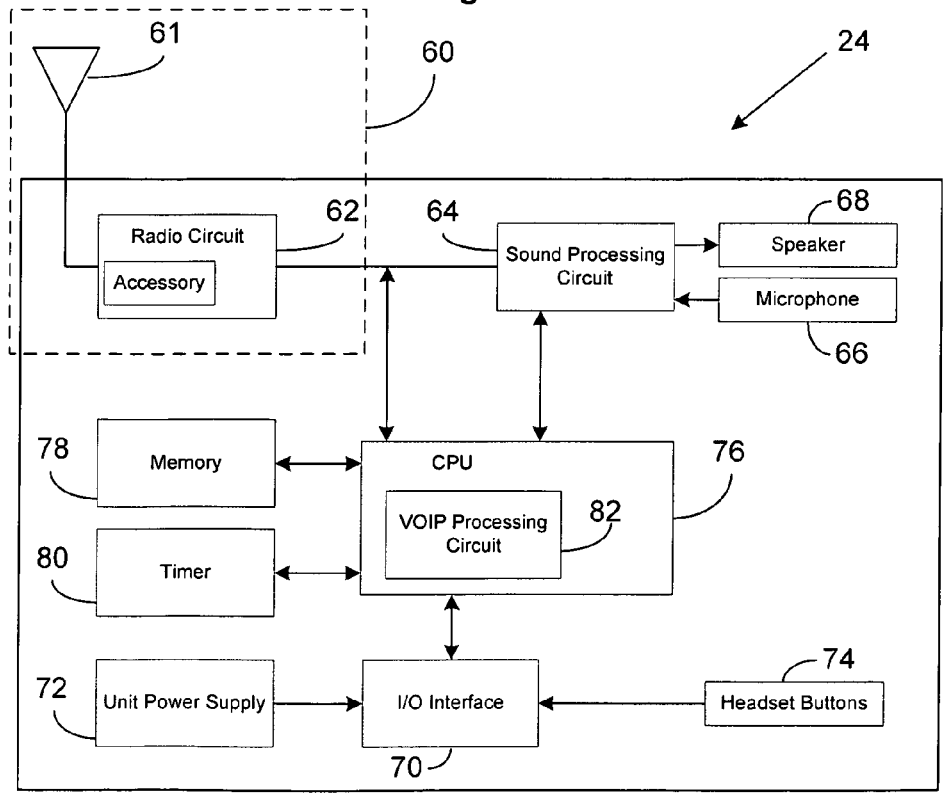
FIG. 2B is a block diagram of an exemplary accessory in accordance with the invention.

Referring now to FIG. 2B, a block diagram of an exemplary accessory 24 is shown (e.g., a wireless head set). The accessory 24 includes an interface 60, which in the present example includes an antenna 61 operatively coupled to a radio circuit 62. The radio circuit 62 is configured to communicate with the corresponding accessory communications circuit 42b of the mobile phone 12. Although not shown, the radio circuit 62 may include a WIFI circuit for communicating with local or wide area networks (LAN, WAN, or the like). The accessory 24, like the mobile phone 12, also includes a sound processing circuit 64, which, in conjunction with a microphone 66 and speaker 68, enables sound to be input and output from the accessory 24. The accessory also includes an I/O interface 70, which distributes power from a power supply 72 (e.g., a battery) to the various sections of the accessory 24, and the I/O interface 70 receives data from buttons 74 of the accessory. The radio circuit 62, sound processing circuit 64 and I/O interface 70 are operatively coupled to a CPU 76, which, in conjunction with memory 78 and timer 80, executes code stored in memory 78 that implements the accessory functionality, e.g., exchange of voice data between the accessory 24 and the mobile phone 12. The accessory also includes a VoIP processing circuit 82 that implements the VoIP functionality in the mobile phone 12 and/or the accessory 24. Although the VoIP processing circuit 82 is shown within the CPU 76, it will be appreciated that the VoIP processing circuit 82 may be implemented separate from the CPU 76.

It is noted that the components illustrated in FIG. 2B are not required for every accessory, but are merely typical or exemplary of an accessory embodied as a head set. If the accessory were a memory card, for example, such an accessory would not require an antenna 60, radio receiver 62, sound processing circuit 44, speaker 48, microphone 46, etc. Further, the interface 60 for an accessory embodied as a memory card can include electrical contacts that electrically connect the memory to the mobile phone circuitry.

The VoIP processing circuit 82 may be implemented via software that is executed by the CPU 76 of the accessory 24 or by the CPU 58 of the mobile phone 12 (e.g., the software may be preloaded on an accessory embodied as a memory card and, when the card is installed in the phone, executed by the processor 58), or via a dedicated hardware circuit, for example. In one embodiment, the VoIP processing circuit 82 is configured so as to cause the accessory 24 to detect or "pair" with the mobile phone 12, thereby establishing a communication link between the respective devices 12 and 24 (assuming the accessory is a wireless device). Once a communication link is established, the VoIP processing circuit 82 installs code on the mobile phone (e.g., a JAVA application or the like), which then is executed by the CPU 58 of the mobile phone 12. The code initiates setup of VoIP, including but not limited to confirmation of installation, selection of the VoIP client and setup of phone books. Further, the VoIP processing circuit 82 implements voice sampling code in the mobile phone 12 and/or in the accessory 24. The voice sampling code can include compression algorithms or the like so as to reduce the amount of data that is transmitted over the packet switched network 20. The VoIP processing circuit 82 also implements network control algorithms that can include network security functions (e.g., passwords) and dialing capabilities.

When the setup has completed, connection to the VoIP gateway 18 is enabled. This connection may be via the WAN (e.g., via the wireless network communications circuit 42*c* of the mobile phone 12 accessing the VoIP gateway 18 through the wireless router 22) or via the mobile service provider's network (e.g., via the mobile phone receiver/transmitter 42*b* accessing the VoIP gateway 18 through the mobile switching network 16).

The VoIP processing circuit 82 can implement the VoIP functionality completely within the mobile phone 12, completely within the accessory 24, or in both (e.g., the appropriate part of the functionality can be implemented in the respective devices). If the VoIP functionality is implemented completely within the accessory 24, then the mobile phone 12 becomes a "dumb terminal" (e.g., an input/output terminal). That is, the mobile phone 12 only is used for data entry and data display, while all VoIP related functionality is executed by the accessory 24. In such a configuration, the accessory can be thought of as a server that contacts the VoIP gateway 18 and coordinates the exchange of data, while the mobile phone can be thought of as a client to the accessory 24.

In one embodiment, the mobile phone 12 handles or controls at least a portion of the user interface, while VoIP functionality is handled or controlled by the accessory 24, the phone 12 or both the accessory and the phone. For example, the mobile phone 12 may be used for key stroke entries (e.g., via the keypad 54), for displaying data (e.g., display of names, numbers, setup parameters, etc., via the display device 56), local data storage and retrieval (e.g., on the phone 12) or remote data storage and retrieval (e.g., on the accessory 24) of phone books, phone numbers (including IP addresses), ring tones, etc. The accessory 24 can retrieve from and/or send to the mobile phone 12 the desired data so as to initiate a call or perform other functions. This data can include, for example, incoming or out going telephone numbers, IP addresses, names, ring tones, or any other data that may be used to initiate or receive a call. Using the data, the accessory 12 can access the VoIP gateway 18 (e.g., via the WIFI 42*c* or Cell 42*b* radios) to establish a VoIP communication. Alternatively, the phone 12 may handle all VoIP functions or share such functions with the accessory 24.

Figure 3:
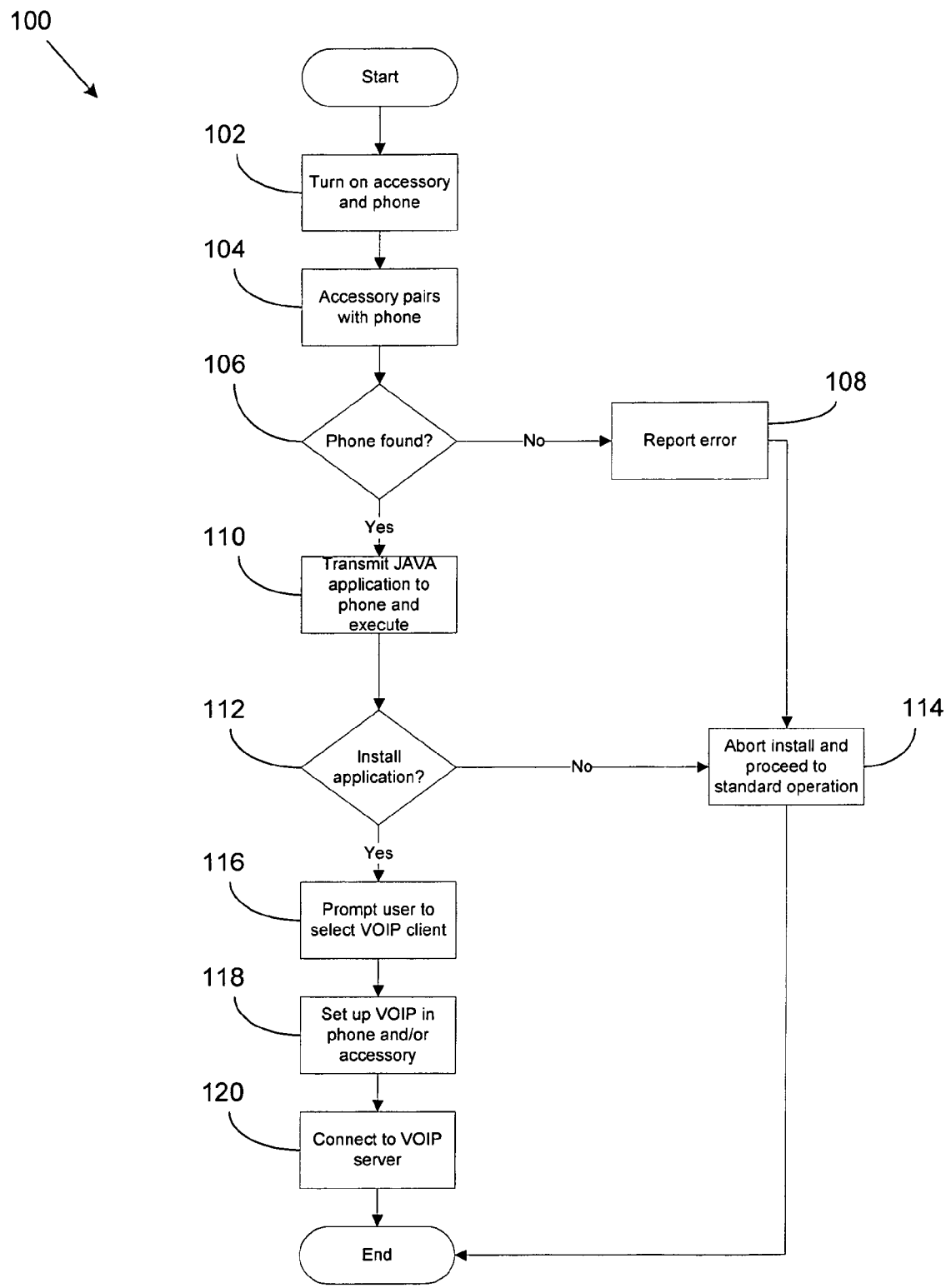
FIG. 3 is an exemplary flow chart illustrating a method of implementing VoIP functionality in accordance with the invention.

Referring now to FIG. 3, a flow diagram 100 illustrating an exemplary method for implementing VoIP in a mobile radio terminal is provided. The flow diagram includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 102, the accessory 24 and mobile phone 12 are placed in an on state. That is, the respective devices are turned on or otherwise provided with power. At steps 104 and 106, the accessory 24 detects the mobile phone 12 (or the phone 12 detects the accessory 24) and a communications link is established between the respective devices. This operation is commonly referred to as the accessory "pairing" with the phone. As will be appreciated by those skilled in the art, pairing between the accessory 24 and the phone 12 typically applies when the accessory 24 is a wireless accessory. If the accessory 24 is physically connected to the mobile phone, then the detection would be via an electrical connection between the accessory 24 and the phone 12.

If the pairing operation is unsuccessful (i.e., the phone is not found), then at step 108 an error message is reported. This message may be in the form of beep codes emitted by the accessory, for example. Then, at step 114 the setup procedure is aborted and standard operation of the phone 12 is resumed.

If the pairing operation is successful (i.e., the mobile phone is found), then at step 110 a JAVA application or the like is transmitted by the accessory 24 to the mobile phone 12. The application is executed by the mobile phone 12 and the installation begins. At step 112, the user is prompted to confirm that he wishes to install VoIP functionality in the phone 12 and/or accessory 24. If the user does not wish to install VoIP functionality, then at step 114 the installation is aborted and standard operation of the phone 12 is resumed. If the user chooses to install VoIP functionality, then at step 116 the application proceeds to configure the phone 12 and/or the accessory 24 so as to enable VoIP functionality. As part of the configuration, the user may be prompted to reply to various setup questions, such selection of a specific VoIP client, setup of phone books, passwords, etc. Based on the response to these prompts, VoIP functionality is installed in the phone 12 and/or the accessory 24 as indicated at step 118. Installation may include implementing voice sampling and/or voice compression algorithms on the phone 12 and/or the accessory 24, as well as implementing network control functionality (e.g., security, dialing capabilities, etc.). At step 120, the phone 12 and/or the accessory 24 can connect to and interact with the VoIP server 18 to initiate and/or receive VoIP communications.

Accordingly, a device and method for implementing VoIP functionality on a mobile radio terminal has been disclosed. The invention is advantageous in that it enables mobile radio terminals, such as mobile phones, to be offered to cellular service providers (who subsequently offer them to their customers) without VoIP functionality, yet allowing easy installation of VoIP at a later time via an accessory.

Specific embodiments of an invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An accessory for an electronic device configured without VoIP functionality, the accessory comprising:
    an interface for exchanging data between the accessory and the electronic device; and
    a voice over internet protocol (VoIP) circuit, wherein the VoIP circuit, via the interface, is operative to transfer instructions to the electronic device, the instructions operative to reconfigure the electronic device to include algorithms enabling VoIP functionality in the electronic device, and
    wherein the accessory is at least one of a communications head set, a battery pack operative to power the electronic device, or a portable memory device installable in the electronic device.

2. The accessory of claim 1, wherein the electronic device is a mobile phone.

3. The accessory of claim 1, wherein the VoIP circuit comprises a processor and code executable by the processor.

4. The accessory of claim 1, wherein the VoIP circuit comprises memory and code stored in the memory.

5. The accessory of claim 1, wherein the VoIP circuit is implemented in hardware.

6. The accessory of claim 1, wherein the interface is a Bluetooth interface or an electrical connection between the accessory and the electronic device.

7. The accessory of claim 1, wherein the VoIP circuit creates a client-server configuration.

8. The accessory of claim 7, wherein the accessory is the server and the electronic device is the client, or the accessory is the client and the electronic equipment is the server.

9. The accessory of claim 1, wherein the electronic device controls at least one user interface, and the accessory and/or electronic device control VoIP processing.

10. The accessory of claim 9, wherein the user interface is configured to manipulate data corresponding to at least one of an electronic phone book, a phone number, a ring tone, a key pad entry or a data display.

11. The accessory of claim 1, wherein the VoIP circuit configures the electronic device to operate as an input/output terminal.

12. The accessory of claim 1, wherein VoIP is implemented in the electronic device, the accessory, or shared between the electronic device and the accessory.

13. The accessory of claim 1, wherein the VoIP circuit is further operative to install the VoIP functionality in the electronic equipment.

14. A method of implementing voice over internet protocol (VoIP) in an electronic device configured without VoIP functionality, comprising the steps of:
    establishing a data link between the electronic device and an accessory of the electronic device; and
    using the accessory to transfer, via the data link, instructions to the electronic device, the instructions operative to reconfigure the electronic device to include algorithms enabling VoIP functionality in the electronic device, wherein the accessory is at least one of a communications head set, a battery pack operative to power the electronic device, or a portable memory device installable in the electronic device.

15. The method of claim 14, wherein configuring at least a portion of VoIP functionality includes configuring the electronic device as an input/output terminal.

16. The method of claim 14, wherein establishing the data link includes using a wireless data link.

17. The method of claim 14, further comprising the step of establishing a client-server configuration between the electronic device and the accessory.

18. The method of claim 17, wherein the accessory is configured as the server and the electronic device is configured as the client, or the accessory is configured as the client and the electronic device is configured as the server.

19. The method of claim 14, further comprising accessing a VoIP gateway via the electronic device and/or the accessory, wherein access to the VoIP gateway is via a local area network, a wide area network, or a cellular circuit switched network.

20. The method of claim 10, wherein configuring at least a portion of VoIP functionality in the electronic device includes implementing voice sampling and network control algorithms.

21. A computer program product directly loadable into internal memory of a digital computer, comprising software code portions for performing the steps of claim 14 when said product is run on a computer.

22. The method of claim 14, further comprising using the accessory to install at least a portion of the VoIP functionality in the electronic equipment.

* * * * *